US011869206B2

United States Patent
Giorgio et al.

(10) Patent No.: US 11,869,206 B2
(45) Date of Patent: Jan. 9, 2024

(54) CONTROLLABLE LASER PATTERN FOR EYE SAFETY AND REDUCED POWER CONSUMPTION FOR IMAGE CAPTURE DEVICES

(71) Applicant: Datalogic IP Tech S.r.l., Lippo di Calderara di Reno (IT)

(72) Inventors: Gianluca Giorgio, Bologna (IT); Mohammad Arrfou, Bologna (IT); Gildo Andreoni, Fanano (IT); Lorenzo Pagli, Zola Predosa (IT)

(73) Assignee: Datalogic IP Tech S.R.L., Lippo di Calderara di Reno (IT)

( * ) Notice: Subject to any disclaimer, the term of this patent is extended or adjusted under 35 U.S.C. 154(b) by 0 days.

(21) Appl. No.: 17/646,237

(22) Filed: Dec. 28, 2021

(65) Prior Publication Data
US 2023/0206480 A1   Jun. 29, 2023

(51) Int. Cl.
*G06T 7/521*   (2017.01)
*H04N 13/128*   (2018.01)

(52) U.S. Cl.
CPC ........... *G06T 7/521* (2017.01); *H04N 13/128* (2018.05)

(58) Field of Classification Search
CPC .............................. G06T 7/521; H04N 13/128
See application file for complete search history.

(56) References Cited

U.S. PATENT DOCUMENTS

| 8,139,204 | B2 | 3/2012 | Braune et al. |
| 9,992,474 | B2 | 6/2018 | Grunnet-Jepsen et al. |
| 10,453,185 | B2 | 10/2019 | Mutto et al. |
| 2013/0104870 | A1* | 5/2013 | Rizzo ..................... A63B 69/38 124/78 |
| 2017/0067734 | A1 | 3/2017 | Heidemann et al. |
| 2017/0223337 | A1 | 8/2017 | Sung et al. |
| 2019/0306441 | A1 | 10/2019 | Chang et al. |
| 2022/0120901 | A1* | 4/2022 | Lyu ....................... G01S 17/894 |

OTHER PUBLICATIONS

European Patent Office, Extended European Search Report in European Patent Application No. 22216316.4, dated May 24, 2023, 7 pages.

* cited by examiner

*Primary Examiner* — Nam D Pham
(74) *Attorney, Agent, or Firm* — Stoel Rives LLP

(57) ABSTRACT

A system and method are described herein for controlling optical power provided to one or more laser projectors of an image capture device, such as a stereo camera, for improving depth image acquisition and quality while adhering to eye safety standards based on laser emissions. The system includes one or more laser projectors operable to emit a laser dot pattern onto a scene, and image capture devices operable to capture images from the scene including the laser dot pattern. The images are analyzed to acquire depth information for objects in the scene, and the depth information is used to modulate the optical power of the laser projectors based on the distance to the object relative to the image capture device.

20 Claims, 7 Drawing Sheets

CONTROLLABLE LASER PATTERN FOR EYE SAFETY AND REDUCED POWER CONSUMPTION FOR IMAGE CAPTURE DEVICES

The project leading to this application has received funding from the European Union's Horizon 2020 research and innovation programme under grant agreement No. 818087.

BACKGROUND

The present disclosure relates generally to the field of image capture devices, and, in particular, to systems and methods for an image capture device using a laser projector with controller laser patterns designed to adhere to eye safety protocols while also reducing overall power consumption.

Conventional cameras capture an image from a single optical focal point and capture pixels corresponding to one or more objects in a scene. Images acquired using these cameras, however, lose depth information relating to a location and distance of the captured objects in the scene relative to the camera. To address these issues, three-dimensional cameras were developed with two or more lenses that allow the camera to capture three-dimensional images of the scene. From these three-dimensional images, depth information for each of the objects in the scene can be determined using various suitable techniques. For example, with stereo cameras, triangulation techniques can be employed to analyze the three-dimensional images and determine the depth of the captured objects using a process known as correspondence. This analysis, however, can sometimes be challenging since it relies on determining which parts of the image captured by one lens of the stereo camera correspond to parts of the image captured by another lens of the stereo camera since points or features in one image must be properly matched with the corresponding points or features in another image to accurately determine depth information.

Another related issue that may complicate the correspondence problem is the available illumination or lighting of the scene. When determining depth information, detectors receive light from the scene and use that information in determining depth of the objects in the scene. However, when insufficient light is available, it can be difficult to properly assess depth information. Many scenes tend to lack sufficient ambient light within the scene, especially when objects are distant from the camera or for large scenes that are being observed by the camera. In other instances, the scene may not have proper ambient lighting in indoor environments where natural sunlight may be limited. To help alleviate these issues, many depth acquisition systems, such as stereo cameras, incorporate one or more laser projectors designed to provide additional light for the scene as well as artificial texturing from the projected laser pattern to improve image quality. For scenes with low contrast or where objects are far away from the camera, the optical power of the laser projectors can be increased to provide more illumination and a higher density laser pattern. However, increasing the optical power of the laser projectors in such systems can cause serious eye injuries to humans, especially when the systems are employed in the consumer space. Accordingly, care must be taken to ensure the laser operates safely within the appropriate emission limits for eye safety, while balancing the need for proper laser output to acquire quality images for determining depth information.

The present inventors have identified a need for a system and method for improving the performance of laser projectors used in stereo cameras or suitable other image capture devices, while reducing overall power consumption and ensuring the laser operates within safety guidelines. Additional aspects and advantages of such methods will be apparent from the following detailed description of example embodiments, which proceed with reference to the accompanying drawings.

Understanding that the drawings depict only certain embodiments and are not, therefore, to be considered limiting in nature, these embodiments will be described and explained with additional specificity and detail with reference to the drawings.

DETAILED DESCRIPTION OF DISCLOSED EMBODIMENTS

Figure 1:
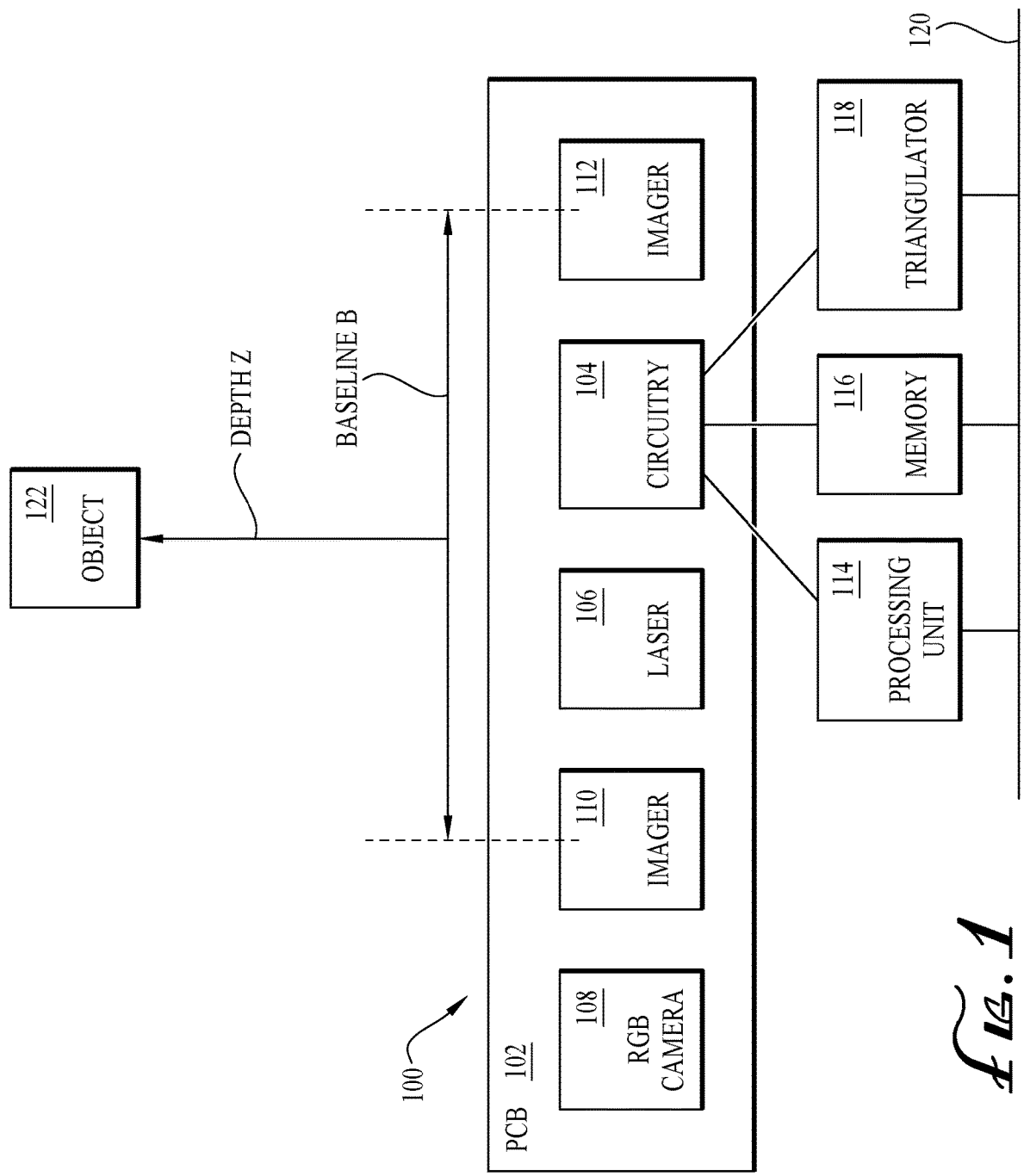
FIG. 1 schematically illustrates components for a stereo camera in accordance with one embodiment.

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

In the following description of the figures and any example embodiments, certain embodiments may describe the disclosed subject matter in the context for use with stereo cameras. It should be understood that these references are merely example uses for the described systems and methods and should not be considered as limiting. The systems and methods described herein may apply or may be adapted to apply generally to image capture devices other than stereo cameras. In other words, the disclosed subject matter may apply to any device capable of acquiring depth information for an object in an image, where the device uses a laser or other suitable emitter, to provide additional illumination and contrast for improved image quality.

As mentioned previously, the disclosed subject matter relates to systems and methods for stereo cameras using a laser projector with controller laser patterns, where the stereo camera is designed to reduce overall power consumption while adhering to applicable eye safety protocols, such as the one set forth by the International Electrotechnical Commission (IEC). Briefly, the IEC sets safety standards for all electrical and electronic equipment, including equipment that operates or uses laser projectors. In particular, IEC 60825-1 sets forth safety standards for laser products, including an Accessible Emission Limit (AEL) that sets forth operating parameters for laser products to ensure eye safety for humans that may be exposed to the laser during use. In the following disclosure, reference to safety standards is aligned with the applicable standards set forth by the IEC.

FIGS. 1-10 collectively describe systems and methods for controlling power provided to one or more laser projectors of an image capture device, such as a stereo camera, for improving depth image acquisition and quality while adhering to eye safety standards. Some stereo cameras are equipped with conventional laser projectors that use an embedded laser pattern that is fixed for the system and has strict maximum operating output power limits to ensure operation within eye safety limits. As further described in detail below, the optical power for the laser projectors of the improved stereo camera disclosed herein is controlled as a function of a measured distance to the observed objects in the scene. When the objects in the scene are close and the stereo cameras are operating at a short range, the optical power of the laser projectors and the density of projected dots onto the scene is decreased to observe eye-safety limits by reducing the electrical power supplied to the laser projectors and by minimizing the number of active and powered projectors. The reduced power and number of active projectors is sufficient to enrich the scene and provide proper contrast for image acquisition while ensuring the laser projectors operate at safe levels. On the other hand, when the objects in the scene are far and the stereo cameras are operating at a longer range, the optical power of the laser projectors and the density of projected dots onto the scene is increased since eye-safety limits are less of a concern at longer ranges. This configuration produces a higher intensity of illumination and dot density on the scene to enrich the scene and provide proper contrast for image acquisition as required at longer ranges.

As is further detailed below, this configuration for modulating power to the laser projectors results in a more balanced power management of the laser projectors and the stereo camera, which minimizes overheating issues and improves overall performance of the stereo camera as compared to conventional designs. In addition, optical power supplied to the laser projectors is constantly managed to ensure eye-safety protocols as set forth by IEC 60825-1 are satisfied. With collective reference to the figures, the following disclosure provides additional details of the systems and method for improved performance of stereo cameras and other image capture devices.

FIG. 1 illustrates an example embodiment of a stereo camera 100 that may be used in conjunction with the disclosed system and methods provided herein. It should be understood that the components of the stereo camera 100 described herein are for reference purposes. The stereo camera 100 may include fewer or additional components than those described herein, and the components may be arranged in any suitable configuration.

With reference to FIG. 1, the stereo camera 100 may include a printed circuit board (PCB) 102 having circuitry 104, a laser projector 106, an RGB camera 108, and a pair of imagers or cameras 110, 112. The circuitry 104 may include various suitable components and configurations as necessary for operating the stereo camera 100 and determining depth information for one or more objects 122 in the scene 50 (see FIG. 2) based on the captured stereoscopic images of the scene 50. Accordingly, circuitry 104 may include one or more processing units 114 which may be any of various suitable commercially available processors or other logic machine capable of executing instructions. In other embodiments, suitable dual microprocessors or other multi-processor architectures may also be employed as the processing unit 114. The circuitry 104 may further include memory 116 which may be implemented using one or more standard memory devices suitable for a stereo camera 100, including RAM, ROM, EEPROM devices, and may also include magnetic or optical storage devices, such as hard disk drives, CD-ROM drives, and DVD-ROM drives. The memory 116 may contain instructions stored therein for controlling operation of the processing unit 114 and its interactions with the laser projector 106, RGB camera 108, imagers 110, 112, and any other component of the stereo camera 100. Any number of program modules may be stored in memory 116, including one or more application programs or modules (such as instructions to implement the methods described herein) for controlling features of the laser projector 106, the RGB camera 108, and the imagers 110, 112. All or portions of the program modules may also be cached in RAM. The circuitry 104 may also include a triangulator 118 for use in determining depth information from images captured by the imagers 110, 112 to identify a position of the object 122 in the scene 50.

The above-described components for circuitry 104, including the processing unit 114, memory 116, and triangulator 118, may be interconnected via a bus 120. While a bus-based architecture is illustrated in FIG. 1, other types of architectures are also suitable (e.g., one or more components may be directly coupled to one another or incorporated together as a single component). While the illustrated embodiment depicts one possible configuration for suitable circuitry 104, it should be recognized that a wide variety of hardware and software configurations may be provided for the stereo camera 100. For example, other embodiments may have fewer than all of these components or may contain additional components.

The laser projector 106 may incorporate any suitable structure, such as a semiconductor laser structure, operable for illuminating the scene 50 with a spatially varying laser dot pattern 75 (see FIG. 2) and introducing texture onto the scene 50 and the objects 122 to aid in the stereoscopic matching process between the imagers 110, 112. For example, in one embodiment, the laser projector 106 may be a Vertical-Cavity Surface-Emitting Laser (VCSEL)

designed to emit a plurality of laser beams through a projection lens to form a laser dot pattern 75 on the scene 50. In other embodiments, the laser projector 106 may instead take the form of an Edge Emitting Laser (EEL) that emits laser beams on the scene 50. In still other embodiments, other suitable laser structures may be used for the laser projector 106. Preferably, the laser projector 106 operates in the infrared spectrum so that the projected laser dot pattern 75 is not observable by the human eye, but other wavelengths may be used in other configurations.

Figure 2:
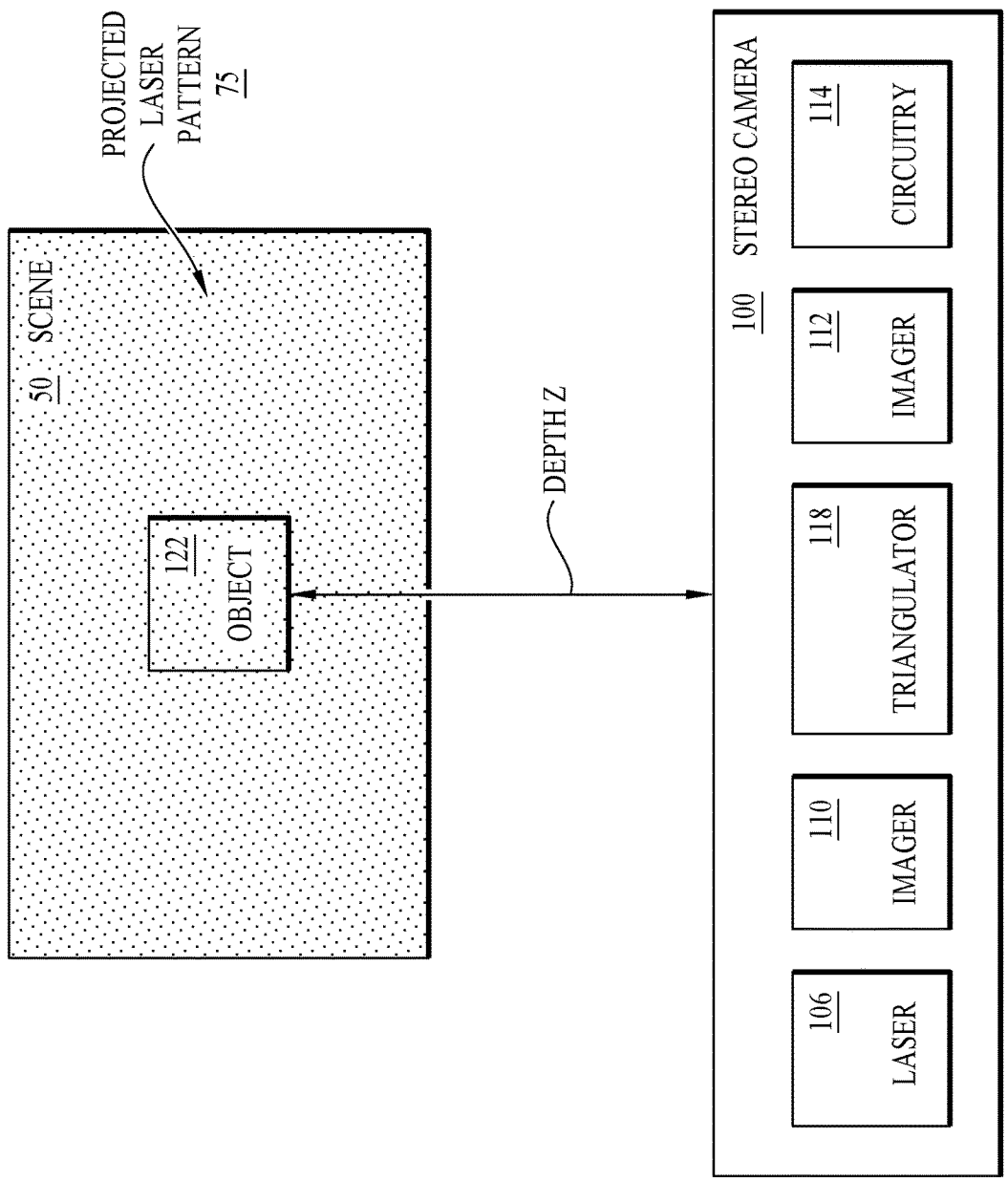
FIG. 2 is a schematic illustration of a stereo camera for monitoring a scene and determining depth information for one or more objects in the scene in accordance with one embodiment.

FIG. 2 illustrates a schematic illustration of the stereo camera 100 used to capture an object 122 in a scene 50 in accordance with one embodiment. With reference to FIG. 2, the following provides a brief overview relating to an example operation of the stereo camera 100 and how a stereo camera 100 is used to capture depth information for an object 122 in the captured scene 50. When the stereo camera 100 is triggered, the laser projector 106 illuminates the scene 50 with a projected laser dot pattern 75 and the imagers 110, 112 each capture one or more images of the scene 50, which may include any number of objects 122 therein. The imagers 110, 112 form a stereoscopic depth camera system, where the two imagers 110, 112 are pointed in the same direction and are separated by a known distance relative to one another referred to as a baseline B (see FIG. 1). As illustrated in FIG. 2, the object 122 in the scene 50 is located at a Depth Z as observed by the imagers 110, 112. Depending on the distance from the imagers 110, 112 to the object 122, the object 122 will shift by a different amount for each of the separate images taken by imagers 110, 112 respectively. The farther the object 122 is within the images captured by the imagers 110, 112, the smaller the shift will be. On the other hand, the closer an object 122 is within the captured image, the larger the shift will be. This shift of the object 122 in the images captured by the imagers 110, 112 is referred to as disparity. The distance or depth, Depth Z, to an object 122 in the scene 50, therefore, depends on how far apart the corresponding points are as established by the disparity for the respective object 122.

If the scene 50 for the object 122 was captured in a single image using a single camera, the image would contain no discernible depth information for any object therein. This is because given an imaginary ray originating from the focal point of the camera and extending to a pixel located on the object of the scene (or any point in the image), it would be impossible to determine where upon the ray that pixel is located. Accordingly, it would be unknown where the object is positioned within the scene.

However, using two images each captured by a camera spaced apart from one another, one can determine where two rays intersect (each ray originating from the focal point of each camera) using correspondence based triangulation methods (or other suitable processing methodologies) to obtain the depth information and identify the position of an object in a scene. Using correspondence processing to analyze two or more images take from different points-of-view of the same three-dimensional scene, one can identify a set of points in one image which can be correspondingly identified as the same points in another image by matching points or features in one image with the corresponding points or features in another image. In this fashion, the stereo camera 100 is capable of capturing images of a scene 50 and determining depth information for every pixel of the object 122 within a captured scene 50.

As noted previously, in some settings, however, it can be difficult to determine depth information even when using a stereo camera 100. For example, regions of a captured scene 50 may lack sufficient detail for various reasons, such as poor lighting, lack of pixel density, and distance of the object 122 from the stereo camera 100. To resolve these issues, some three-dimensional imaging and depth sensing systems may incorporate a laser projector, such as a laser projector 106, to aid in correspondence processing and analysis. Projecting a laser dot pattern 75 onto the scene 50 helps improve the accuracy and resolution for the depth determination algorithms for objects or scenes that lack sufficient natural detail. For the laser projector 106, the more output power is used, the brighter each spot will be in the projected dot pattern 75, which in turn provides the depth sensing system with a greater operating range for capturing far away objects within the scene.

While laser projectors 106 improve performance of stereo cameras 100, laser safety for depth sensing systems is a significant concern. Lasers are capable of emitting energy at sufficiently high levels that may cause eye injuries or blindness to humans. Moreover, because depth sensing systems are commonly use in consumer electronics, such as cameras, smart phones, tablets, and gaming platforms, applicable eye safety standards limit the power output for such laser projectors 106, thereby making it challenging for such systems to operate with improved depth resolution and capability to determine depth information in certain settings, such as when objects 122 are far from stereo camera 100.

With collective references to FIGS. 3-10, the following describes systems and methods for modulating power provided to the laser projectors 106 of the stereo camera 100 to improve overall performance of the stereo camera 100 while ensuring eye-safety limits are observed.

Figure 3:
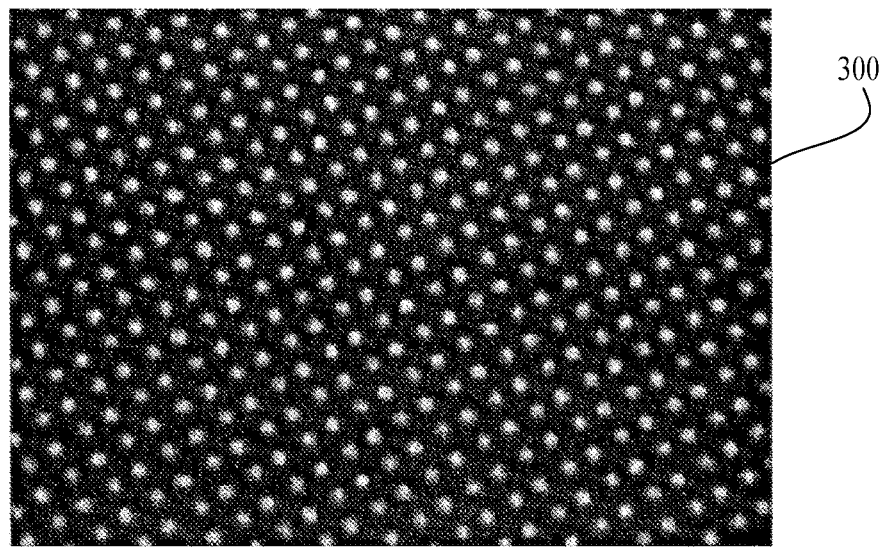
FIG. 3 is a representative image of an example laser pattern projected by a stereo camera in accordance with one embodiment.
Figure 4:
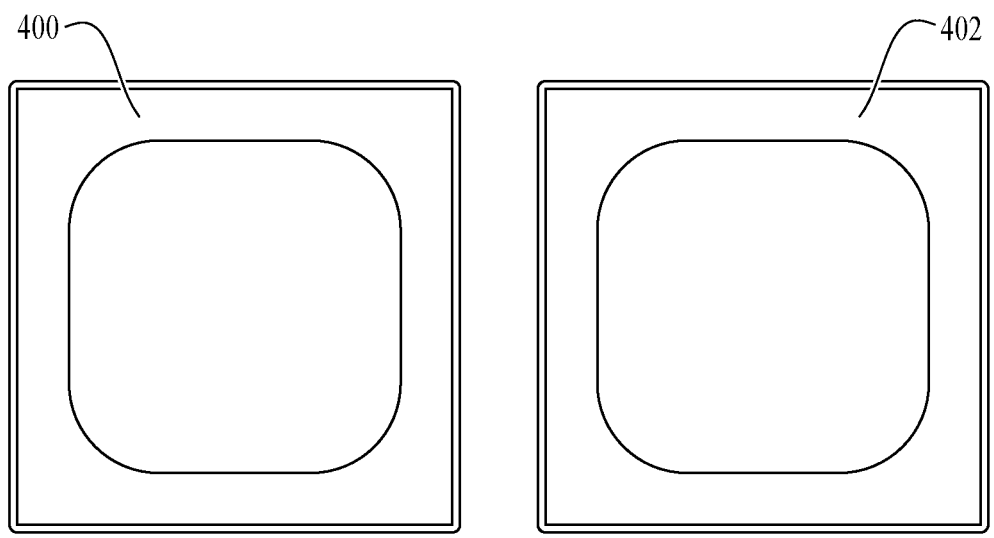
FIG. 4 is a schematic illustration of an example configuration for laser projectors of a stereo camera in accordance with one embodiment.
Figure 5:
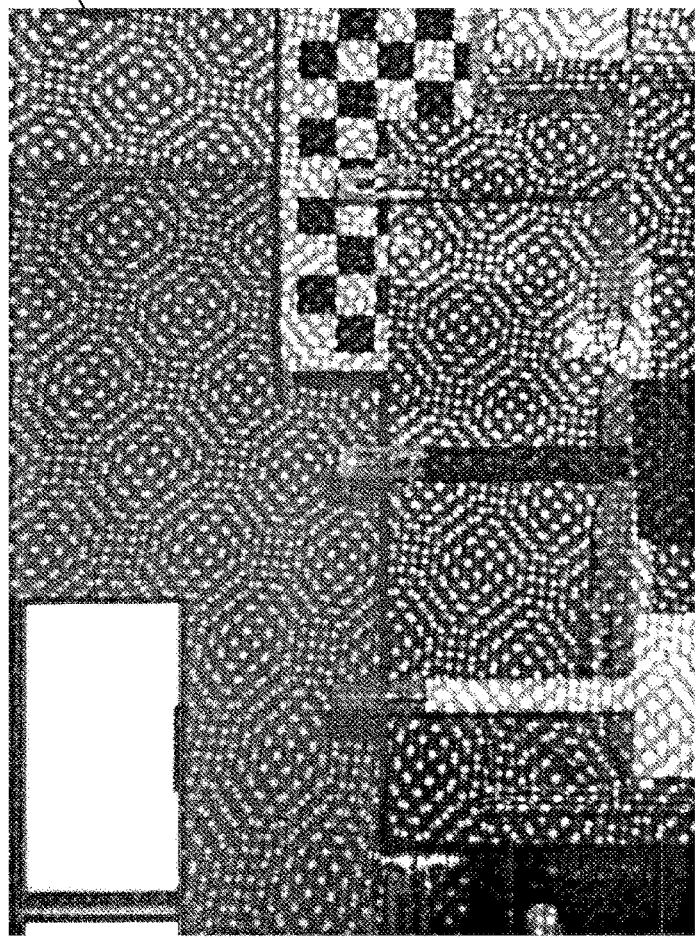
FIG. 5 is a representative image of an example laser pattern projected on a scene in accordance with one embodiment.

With reference to FIGS. 3-6, the following describes an example arrangement for a stereo camera 100 including multiple laser projectors 106 arranged to optimize performance. FIG. 3 illustrates a single laser pattern 300 obtained using a single laser pattern projector (not shown) supplied to produce an optical power of 400 mW. To increase the dot density of the laser pattern 300 and the total optical power, FIG. 4 illustrates one example configuration using multiple laser pattern projectors. With reference to FIG. 4, the configuration includes a first laser projector 400 arranged to provide a laser pattern with a rotation of 5°±1.5°, and a second laser projector 402 arranged to provide a laser pattern with a rotation of 15°±1.5°. Mounting these two laser projectors 400, 402 in a side-by-side configuration as shown in the stereo camera 100 produces a projected laser pattern 500 on the scene as shown in FIG. 5. As illustrated in FIG. 5, the projected laser pattern 500 includes a laser pattern that provides improved contrast and illumination for the depicted scene.

Figure 6:
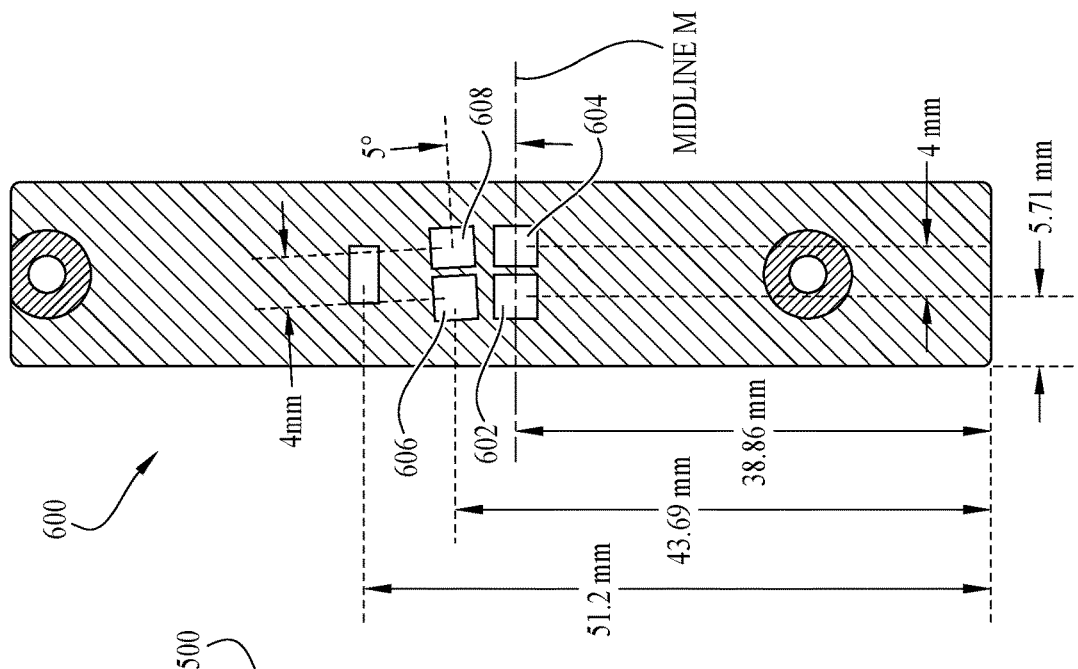
FIG. 6 is a schematic illustration of another example configuration for a stereo camera using an arrangement of multiple laser projectors in accordance with one embodiment.

During a testing phase, the image quality of the stereo camera 100 was examined using additional laser pattern projectors (not shown) mounted in a remote position closer to the scene, while the stereo camera 100 was arranged to monitor the scene from a further distance. In this configuration, the accuracy of the distance measurements of the stereo camera 100 was improved by approximately 75% when using the additional remote laser projectors as compared to a baseline measurement using only the stereo camera 100. This improvement was due to higher dot density projected onto the scene and the additional optical power used for the remote laser projectors. For this reason, the stereo camera 100 was adjusted to increase the total number of laser projectors to further increase the density of dots and the optical power density of the overall system, where the projectors were mounted in the configuration illustrated in FIG. 6. With reference to FIG. 6, the projector assembly 600 illustrates a first pair of laser projectors 602, 604 aligned side-by-side with one another. The assembly 600 further includes a second pair of laser projectors 606, 608 arranged at an angle of approximately 5° relative to a midline M extending through a center of the first pair of laser projectors 602, 604 as illustrated. As configured, the assembly 600 increases the overall dot density of the laser pattern projected onto the scene, but not the single dot optical power, which is equal to 0.070 mW.

While FIG. 6 illustrates a stereo camera assembly 600 where the laser projectors 602, 604, 606, 608 are mounted in a common housing with other components thereof, in other embodiments, some or all of the laser projectors 602, 604, 606, 608 may be arranged remotely and operate in conjunction with the stereo camera assembly 600, where the remote projectors are arranged to project patterns on the scene in a similar fashion as would laser projectors mounted within a common housing of the stereo camera assembly 600. In such embodiments, the projector position relative to the camera assembly 600 is known and distances to the objects can be adjusted so they are measured relative to the projector position and not the stereo camera.

As noted previously, the laser projectors 602, 604, 606, 608 used in the assembly 600 are all preferably infrared projectors that project the laser beam pattern in the infrared spectrum so that it is not visible by humans. The laser projectors preferably have high contrast characteristics so that laser beams spots can be observed even in brightly lit rooms or environments with high ambient brightness. Further, the laser pattern projected onto the scene preferably incorporates a kind of randomness suitable for active stereo vision systems, such as the pattern rotation described previously with reference to FIGS. 3-6. In the described embodiment, without the rotation, there may be a repetition period inside a line and the depth image may consequently be incorrect. Preferably, the laser projectors are static (or not dynamic) to avoid laser beam spots moving around so that the dependence of the stereo algorithm on the pattern can be averaged out. The density of the laser pattern projected onto the scene via the laser projectors is ideally between 20K and 300K points for a 2 MP imaging system. Any suitable number of laser projectors (preferably at least 4 or 6) can be used with the stereo camera 100 to increase the dot density and the coverage of the scene. In some embodiments, the dot density may be programmable so that dot patterns can increase or decrease in density and dot count, depending on usage or need. This feature is useful when changing resolution of the imaging system to match dot density with resolution. This arrangement could be managed by integrating several laser projectors with separate driving circuits to be controlled depending on the arrangement and/or information from the image, such as object distance or ambient lighting.

The laser projector preferably has little or no laser speckle so as to avoid creating different views from the imagers 110, 112, since that may deteriorate the depth performance. Further, the laser projectors have a wide depth-of-field so that the laser pattern is well defined across the whole depth operating range. Similarly, the field of illumination (FOI) is preferably wide enough, similar to the field-of-view (FOV) of the lenses for the imagers 110, 112 to avoid the need to crop images. Preferably, the laser projectors 602, 604, 606, 608 are small, cost effective, robust, and optically efficient so as to reduce overall power consumption during use and simplify product integration and longevity. Moreover, the laser projectors are preferably eye safe to avoid the potential for eye injury due to the reduced excitation duty cycle that is synchronized with the acquisition time interval.

Figure 7:
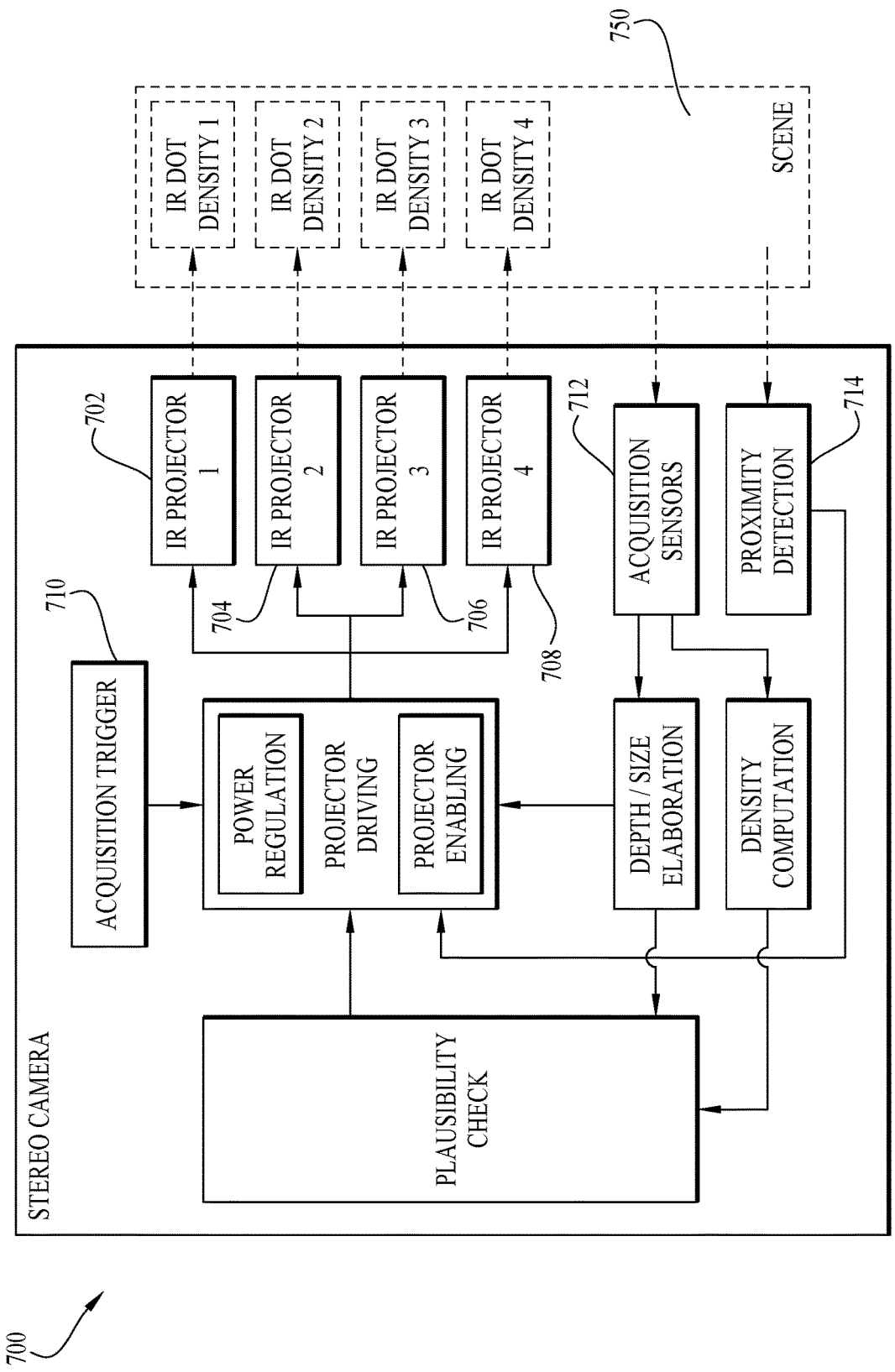
FIG. 7 is a schematic illustration of various processing steps completed by the stereo camera in accordance with one embodiment.
Figure 8:
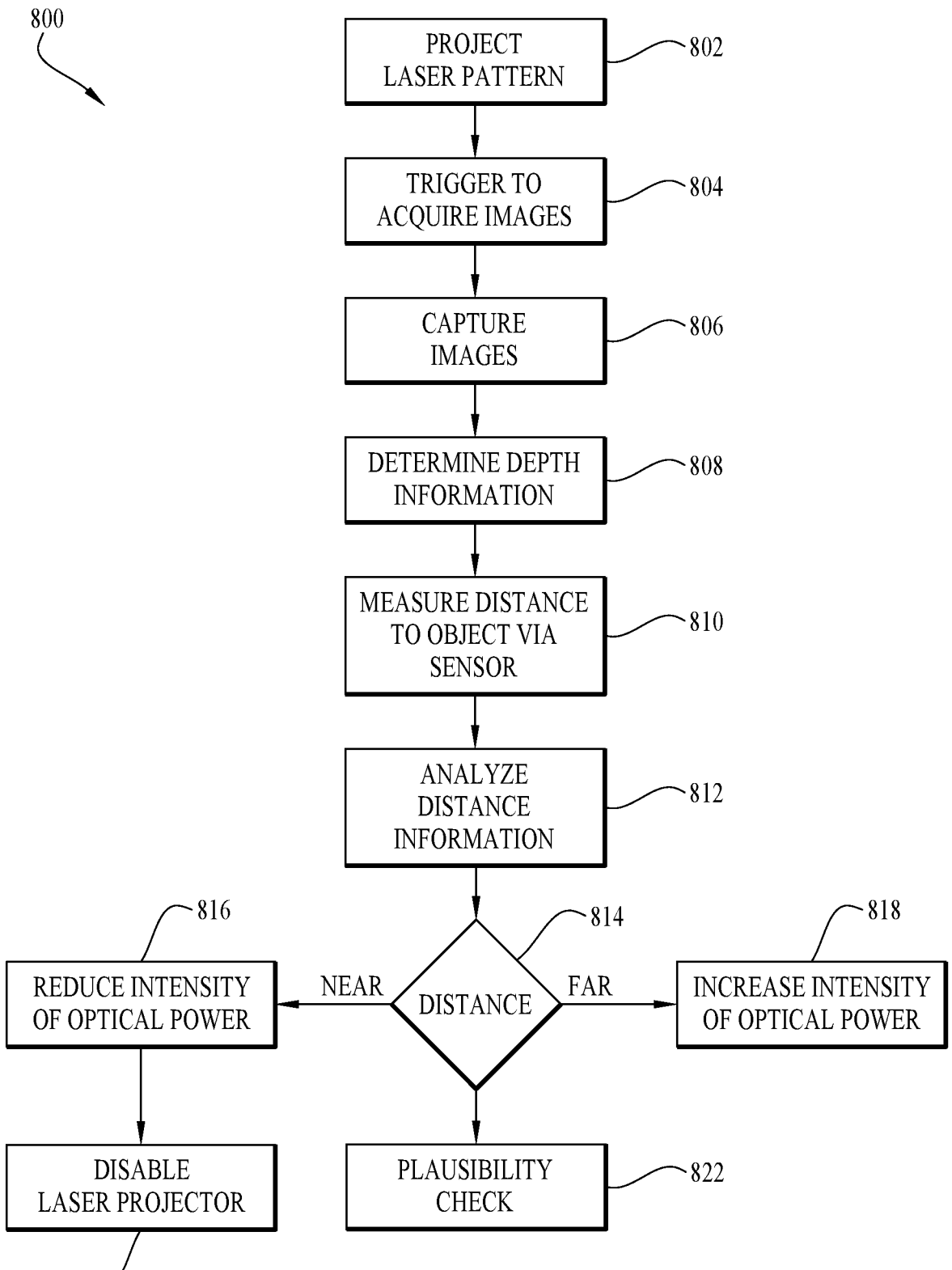
FIG. 8 is a block diagram illustrating a method for modulating power supplied to the laser projectors of the stereo camera to aid in determining depth information for the objects in the scene in accordance with one embodiment.

With collective reference to FIGS. 7 and 8, the following describes systems and methods for modulating power provided to the laser projectors of the stereo camera 100 for improved performance. In some embodiments, the stereo camera 100 may be configured with laser projectors having some or all of the features described in the foregoing paragraphs. However, it should be understood that the above description of the laser projectors presents an example configuration and is not intended to be limiting. In other embodiments, other laser projectors may be incorporated into the stereo camera 100 with different parameters, performance characteristics, and functionalities without departing from the principles of the disclosed subject matter.

FIG. 7 schematically illustrates a stereo camera 700 and FIG. 8 illustrates a method 800 for modulating optical power to one or more laser projectors 702, 704, 706, 708 of the stereo camera 700 for improved image acquisition performance while ensuring adherence to applicable eye-safety limits. Briefly, the stereo camera 700 may include many of the same components operating in a similar fashion as the stereo camera 100 described previously with reference to FIGS. 1-2 and the stereo camera assembly 600 described with reference to FIG. 6. While some of the components may not be illustrated or described in FIG. 7, it should be understood that those components have similar features and functionality as the corresponding components described with reference to FIGS. 1-2 and 6. Moreover, the stereo camera 700 and the method 800 described herein includes a stereo camera arrangement using four laser projectors. It should be understood that the stereo camera 700 and method 800 may be adjusted to apply equally to configurations using fewer or more laser projectors. Moreover, as noted previously, it should be understood that the method 800 may apply to other suitable devices other than stereo cameras, since other devices may be capable of modulating power based on a distance to an object in a scene.

With collective reference to FIGS. 7 and 8, at step 802, the infrared laser projectors 602, 604, 606, 608 are activated and each project an infrared laser dot pattern onto the scene 750 with a corresponding infrared dot density (illustrated as dot density 1, dot density 2, dot density 3, and dot density 4 in FIG. 7). The laser dot pattern is projected onto the scene 750 and onto any objects (not shown) present on the scene 750 in a similar fashion as described previously. At step 804, the acquisition trigger 710 of the stereo camera 700 is activated to begin the image acquisition process of the scene 750 and any objects therein. At step 806, the acquisition sensors 712 (such as imagers 110, 112, or other image capture devices, or any other suitable acquisition sensors), are activated and each capture one or more images of the scene 750. Once the images of the scene 750 have been captured, at step 808, the images are processed and analyze to determine depth/size information for any objects (such as object 122) in the scene 750. As described previously, the process may include any of various suitable image processing methodologies, such as triangulation, and may be accomplished by any suitable components of the stereo camera, including the processing unit 114, triangulator 106, and/or other suitable components of the circuitry 104).

At step 810, a sensor 714 (such as a proximity sensor or other suitable sensor) measures a distance to the object in the scene 750 relative to a position of the stereo camera 700. The proximity sensor 714 may be any suitable sensor capable of measuring a distance to an object, and may include a three-dimensional sensor, a rangefinder, or any other suitable sensor. At step 812, the distance information acquired by the proximity sensor 714 and the depth information determined from the images captured by the acquisition sensor 712 is analyzed and communicated to the processing unit 114 (or other component of the circuitry 104) that regulates power and drives the laser projectors 702, 704, 706, 708.

At step 814, based on the distance information as determined by the proximity sensor 714 and the depth information determined from the images of the scene 750, the processing unit 114 (or other component of the circuitry 104) modulates the intensity of the optical power supplied to one or more of the laser projectors 602, 604, 606, 608. In some embodiments, the processing unit 114 may rely solely on the depth information as determined from the captured images of the scene 750 to modulate the optical power, or may instead rely solely on the distance information as determined by the proximity sensor 714, or as described above may rely on both sets of information. In other embodiments, the processing unit 114 may instead analyze both sets of information and determine the minimum distance based on either the information from the proximity sensor 714 or the depth information calculated from the images to ensure power is modulated based on the shortest distance to the objects in the scene 750 for additional safety.

At step 816, when the objects are determined to be near the stereo camera 700 in the scene 750, the intensity of the optical power supplied to the one or more laser projectors 702, 704, 706, 708 may be reduced relative to a base setting to reduce the intensity of the projected dot pattern on the scene 750 and minimize the potential for injury. Moreover, since the object is close to the stereo camera 700, less optical power is typically required to provide sufficient contrast on the scene 750 and obtain quality depth images from the acquisition sensors 712. Alternatively, at step 818, when the objects are determined to be far from the stereo camera 700 in the scene 750, the intensity of the optical power supplied to the one or more laser projectors 702, 704, 706, 708 is increased relative to the base setting to enhance illumination and project dot patterns with more intensity to increase the contrast on the scene 750 and obtain quality depth images from the acquisition sensors 712. As noted previously, since the objects in the scene 750 are at a longer distance from the stereo camera 700, the likelihood of causing injury is reduced even when the laser projectors 702, 704, 706, 708 are operating at higher power levels.

It should be understood that while the method 800 may be described with reference to the scene 750 having only one object (such as object 122) therein for purposes of facilitating the description, the method 800 may be adapted for scenes including various objects therein, where some objects may be located at a different distance from others relative to the stereo camera 700. In such embodiments, the method 800 as described above may proceed with reference to the object closest to the stereo camera 700 to prioritize eye safety. For example, in such embodiments, the method 800 may include an additional step between steps 808 and 810, where the depth information for each object in the scene 750 is analyzed to identify the closest object. Thereafter, the method 800 proceeds as described with reference to the closest object, with the optical power provided to the laser projectors being modulated based on the assessment of the closest object to the stereo camera 700. By implementing the method 800 taking the closest object into account, the method 800 will result in the overall use of a lower optical power for the laser projectors for scenes 750 with multiple objects at various distances.

The distinction between a near object and a far object may depend on various factors and considerations, such as the operating intensity of the laser projectors and the operating range of the stereo camera 700. Accordingly, a determination of when an object is determined to be near the stereo camera 700 and when it is far from the stereo camera 700 may vary for different configurations. As an example, in some embodiments, a near object may be characterized as any object within 3 meters of the stereo camera 700, and a far object may be characterized as any object further than 3 meters from the camera. It should be understood that these figures are provided for reference purposes only, and may be altered in other configurations without departing from the principles of the disclosed subject matter.

As described above, method 800 is written with reference to the laser projectors 602, 604, 606, 608 being mounted within a common housing of the stereo camera 700. As such, the distance of the object to the stereo camera 700 is referenced as the basis for modulating optical power to the laser projectors 602, 604, 606, 608 since the laser projectors 602, 604, 606, 608 are mounted within the stereo camera 700. In other embodiments, the laser projectors may instead be mounted remotely from the stereo camera, where the remote laser projectors operate in a similar fashion as described previously to project a laser dot pattern onto the scene 750. In such embodiments where the laser projectors are remote and separate from the stereo camera 700, the method 800 may be adjusted such that the basis for modulating power is calculated with reference to a position of the remote projector rather than a position of the stereo camera 700. In other words, for objects in the scene near a position of the remote laser projectors, the intensity of optical power supplied to the laser projectors is reduced to minimize potential injury. Similarly, for objects in the scene far from the remote laser projectors, the intensity of optical power supplied to the laser projectors is increased since the injury risk is reduced.

As described in method 800, by modulating power supplied to the laser projectors 702, 704, 706, 708 of the stereo camera 700, the system is able to conserve power by ensuring that power is apportioned based on a distance of the objects in the scene 750, while at the same time minimizes the risk of injury since the laser projectors 702, 704, 706, 708 will operate at lower power when the objects are near and only operate at higher power when the objects are further away. The method 800 described above provides one example where power is increased or decreased based on a distance from the objects. In other embodiments, the described power modulation may take any of various suitable forms.

For example, in some embodiments, the optical power supplied to the laser projectors 702, 704, 706, 708 may be modulated continuously based on the distance information as determined by the proximity sensor 714, the depth information from the acquisition sensors 712, or both as described previously. In other words, a feedback loop may be created to adjust the optical power in a proportional relationship to the distance of the objects in the scene 750. This arrangement may be advantageous when the objects in the scene 750 are continuously moving relative to the stereo camera 700. For example, the object may initially be far away from the stereo camera 700, at which point the laser projectors 702, 704, 706, 708 may be supplied with a high optical power. Thereafter, the object may move closer and be near the stereo camera 700. As the object moves closer, the optical power provided to the laser projectors 702, 704, 706, 708 may be continuously decreased to ensure proper emission limits are satisfied based on the distance of the object to the stereo camera 700. As described, the continuous adjustment ensures that the laser projectors 602, 604, 606, 608 are providing proper illumination and contrast on the scene 750 based on object distance, while the intensity of the laser patterns projected on the scene 750 remain at safe levels. Further, as noted above for scenes 750 with multiple objects at various distances, the closest object is used to ensure the laser projectors 602, 604, 606, 608 are supplied with lower optical power to minimize potential injury.

In other embodiments, rather than making a continuous adjustment to the laser projectors 702, 704, 706, 708 based on distance information to the object, adjustments may instead be made when the object in the scene 750 is at specific ranges from the stereo camera 100. For example, the optical power may be set to a first intensity level when the object in the scene 750 is at a first distance range from the stereo camera 100. While the object remains within the first distance range, the optical power may remain at the first intensity level, even if the object is moving in the scene 750, so long as the object remains in the first distance range. As the object moves further away from the stereo camera 700, it crosses into a second distance range. While the object is in the second distance range, the optical power may be increased to a second intensity level higher than the first intensity level to provide proper illumination and contrast to the scene 750. Again, while the object remains at this second distance range, the optical power remains at the second intensity level. As the object moves even further away, it crosses into a third distance range. While the object is in the third distance range, the optical power may be increased to a third intensity level higher than the second intensity level to provide proper illumination and contrast to the scene 750. As the object moves between the ranges, either closer or further away from the camera, the proper adjustments to the optical power can be made. In this configuration, the stereo camera 700 is able to provide sufficient optical power to the laser projectors 702, 704, 706, 708 based on the distance measurements to ensure the laser projectors 702, 704, 706, 708 (or a selected subset thereof) can correctly detect objects at a suitable distance from the stereo camera 700, to reduce and optimize stereo camera power consumption, and to promote a more efficient performance of the overall system while also ensuring safety.

Returning to FIG. 8, the method 800 may include a step 820, where some or all of the laser projectors 702, 704, 706, 708 are entirely disabled when the proximity of the object 122 is below a predefined short distance to minimize risk to eye safety from the projected laser beams. In some embodiments, the short distance may be below the minimum working distance of the stereo camera 700. In such embodiments, an additional low-range proximity sensor may be incorporate to track a distance of the object relative to the stereo camera 700.

In some embodiments, the method 800 may also include a step 822, where the density of the emitted laser dots as captured by the acquisition sensors 712 is used as a reference for a plausibility check relating to possible deterioration of the depth measure in the stereo images or relating to other issues impacting overall performance of the stereo camera 700. In such embodiments, once the dot density for the respective laser projectors 702, 704, 706, 708 is set, and since the depth measure (z distance) and the object x-y dimension are retrieved from the stereo image, one can compare the number of dots in the portion of the image defined by the detected object with the expected dot density at a certain distance from the stereo camera 700. The results of this measurement may provide information about the performance of the stereo camera 700.

While the method 800 describes an arrangement where power is modulated based on distance information for the objects in the scene 750, other configurations are possible. For example, in some embodiments, the laser projectors 702, 704, 706, 708 of the stereo camera 100 may simply be powered on only during the image acquisition phase, and thereafter powered off when images are not being actively acquired. In other embodiments, a subset of laser projectors 702, 704, 706, 708 may be switched on and off at different intervals based on the distance to the objects in the scene 750. In still other embodiments, the intensity of optical power for each laser projector 702, 704, 706, 708 can be managed to increase the maximum emission during a short exposure cycle and reduce the emission during a longer exposure cycle to minimize exposure time of the laser beams. In the case of High Dynamic Range (HDR), this configuration may provide sufficient contrast and maintain the mean optical power below the accessible emission limit for eye-safety.

While the method 800 is described with reference to a single stereo camera arrangement, many of the same features in the method 800 may be combined in a multiple stereo camera configuration. For example, with reference to FIG. 9, a master control unit 900 may be added to control and give feedback signals to each of the stereo cameras 902, 904, 906, where the stereo cameras 902, 904, 906 may operate in a similar fashion as the stereo camera 700 of FIG. 7. The signal may be based on the distance information to the object in the scene, or other suitable information. Depending on the signal, the stereo cameras 902, 904, 906 may each adjust the intensity of optical power for their respective laser projectors, turn on or off one or more laser projectors, or take other suitable action. In some embodiments, the master control unit 900 may be configured to collect three-dimensional images from each of the various stereo cameras 902, 904, 906 and provide feedback signals based on an analysis of the three-dimensional images as described in method 1000 of FIG. 10.

Figure 10:
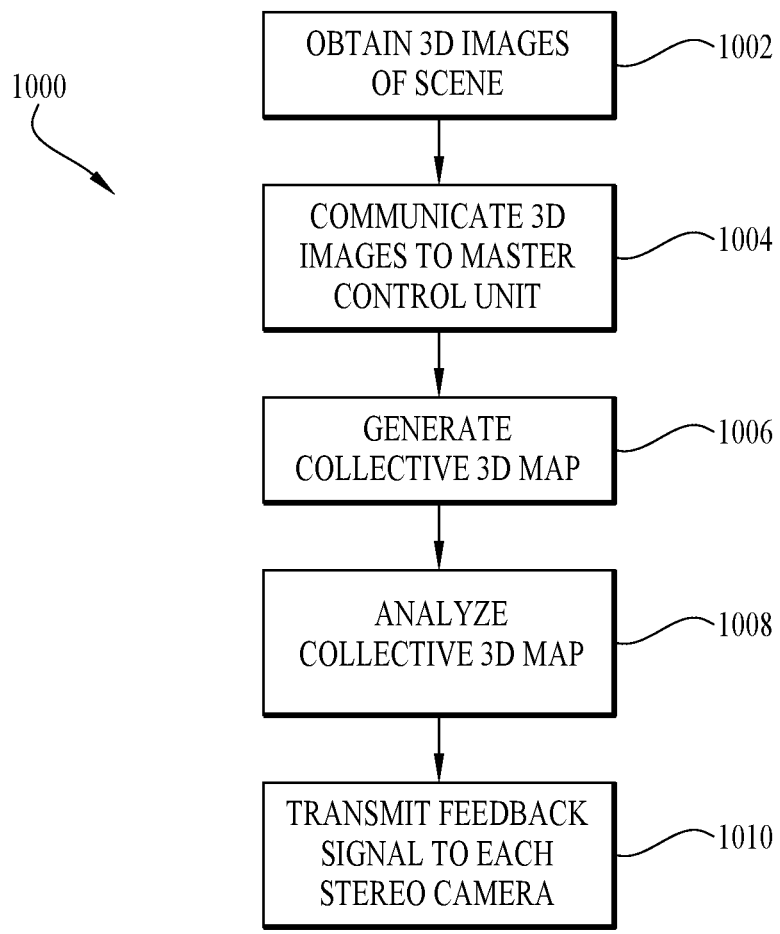
FIG. 10 is a block diagram illustrating a method for modulating power supplied to the laser projectors of the respective stereo cameras by the master control unit to aid in determining depth information for the objects in the scene in accordance with one embodiment.

With reference to FIG. 10, a step 1002, the stereo cameras 902, 904, 906 are triggered and acquire three-dimensional images of the scene 750 (see FIG. 7). At step 1004, the three-dimensional images from each of the various stereo cameras 902, 904, 906 are communicated to the master control unit 900 for analysis. The master control unit 900 may include any conventional memory, processing units, or circuitry (not shown) for receiving and storing the images and completing all analysis steps. At step 1006, the master control unit 900 integrates all the three-dimensional images and generates a collective three-dimensional map using the acquired three-dimensional images. The three-dimensional map may be a depth map, a fused voxel map, or any other suitable map that can be generated from three-dimensional images. Thereafter, at step 1008, the master control unit 900 analyzes the quality of the collective three-dimensional map based on the images as obtained from each of the individual stereo cameras 902, 904, 906. The analysis may include a statistical analysis based on (a) the number of invalid depth pixels in each stereo camera's three-dimensional image; or (b) a calculation of image accuracy or precision; or (c) a calculation of an overall three-dimensional image accuracy or precision.

At step 1010, the master control unit 900 transmits a feedback signal for each of the stereo cameras 902, 904, 906 based on the analysis at step 1008 above. For example, if the collective three-dimensional map is of poor quality relative to a threshold value, then the feedback signal from the master control unit 900 may provide instructions to one or more of the stereo cameras 902, 904, 906 to power on one or more of their respective laser projectors or to otherwise increase the dot density projected by the respective laser projectors to introduce more illumination and contrast for obtaining a better quality image. Moreover, if the three-dimensional map is of good quality, then the feedback signal may not provide additional instructions to any of the stereo cameras 902, 904, 906 since no adjustments are necessary. In some embodiments, to further conserve power, the master control unit 900 may provide a feedback signal to power off some lasers projectors or to otherwise reduce the optical intensity of the laser projectors since the additional illumination and contrast may not be necessary, thereby further reducing the risk of eye injury. The master control unit 900 may continuously assess and update the collective three-dimensional depth map as it receives three-dimensional images from the stereo cameras 902, 904, 906 to assess overall performance of multiple stereo camera arrangement. In this fashion, the master control unit 900 may continuously monitor and send feedback signals to modulate power for each of the stereo cameras 902, 904, 906 and ensure acquisition of quality depth images for analysis, while also ensuring that laser performance is maintained at or below emission levels to optimize eye safety.

Figure 9:
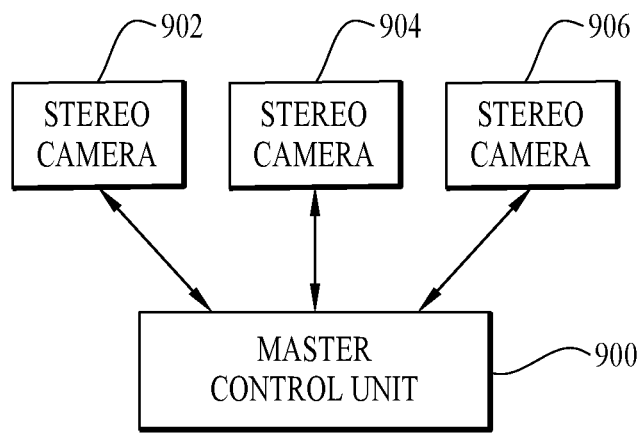
FIG. 9 is a schematic illustration of a master control unit for use in an arrangement of multiple stereo cameras monitoring a scene in accordance with one embodiment.

It should be understood that while the foregoing embodiment of FIGS. 9 and 10 provides a multiple stereo camera arrangement with three stereo cameras, any suitable number of stereo cameras may be used without departing from the principles of the disclosed subject matter. In addition, certain of the steps described above in methods 800 and 1000 may be combined, altered, varied, practiced out of the described sequence, and/or omitted without departing from the principles of the disclosed subject matter. It is intended that subject matter disclosed in portion herein can be combined with the subject matter of one or more of other portions herein as long as such combinations are not mutually exclusive or inoperable. In addition, many variations, enhancements and modifications of the systems and methods described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. An image acquisition system comprising:
one or more image acquisition subsystems, each of the one or more image acquisition subsystems comprising:
a plurality of laser projectors, each laser projector operable to emit a laser dot pattern including a dot density onto a scene, the scene including one or more objects therein;
at least a first and second image capture device, each device operable to capture one or more images from the scene having the laser dot pattern projected thereupon; and
circuitry components operable to determine from the one or more images depth information for each object of the one or more objects in the scene, the depth information including a distance to the object relative to a position of the plurality of laser projectors,
wherein the circuitry components are further in communication with each laser projector of the plurality of laser projectors, and wherein the circuitry components modulate both an optical power supplied to each laser projector of the plurality of laser projectors and a dot density of the laser dot pattern to adjust an optical power level of the plurality of laser projectors based on the distance to the object relative to a position of the plurality of laser projectors.

2. The image acquisition system of claim 1, wherein when the distance to the object is less than a predetermined threshold distance, the circuitry components reduce optical power relative to a base setting supplied to the plurality of laser projectors, and wherein when the distance to the object is greater than a predetermined threshold distance, the circuitry components increase optical power relative to the base setting supplied to the plurality of laser projectors.

3. The image acquisition system of claim 1, wherein the modulation of the dot density of the laser dot pattern includes the circuitry components decreasing the number of active laser projectors from the plurality of laser projectors to reduce the dot density of the laser dot pattern, and wherein modulation of the dot density of the laser dot pattern includes the circuitry components increasing the number of active laser projectors from the plurality of laser projectors to increase the dot density of the laser dot pattern.

4. The image acquisition system of claim 1, each of the one or more image acquisition devices further comprising a proximity sensor operable to acquire a distance to each of the one or more objects in the scene relative to the position of the plurality of laser projectors, wherein the circuitry components modulate optical power based further on the distance acquired by the proximity sensor.

5. The image acquisition system of claim 1, wherein the circuitry components are further operable to entirely disable the plurality of laser projectors based on the distance of the object falling below a minimum working distance of the first and second image capture device.

6. The image acquisition system of claim 1, the system further comprising a master control unit in operable communication with each of the one or more image acquisition devices, the master control unit operable to transmit a feedback signal to the circuitry components of each of the one more image acquisition devices to modulate the optical power supplied to the plurality of laser projectors.

7. An image acquisition system comprising:
one or more image acquisition subsystems, each of the one or more image acquisition subsystems comprising:
one or more laser projectors, each laser projector operable to emit a laser dot pattern onto a scene, the scene including one or more objects therein;
a first and second image capture device, each device operable to capture one or more images from the scene having the laser dot pattern projected thereupon;
circuitry components operable to determine from the one or more images depth information for each object of the one or more objects in the scene, the depth information including a distance to the object relative to a position of the one or more laser projectors; and
a master control unit in operable communication with each of the one or more image acquisition devices, the master control unit operable to transmit a feedback signal to the circuitry components of each of the one more image acquisition devices to modulate the optical power supplied to the one or more laser projectors, wherein the circuitry components are further in communication with each of the one or more laser projectors, and wherein the circuitry components modulate optical power supplied to the one or more laser projectors to adjust an optical power level of the laser projectors based on the distance to the object relative to a position of the one or more laser projectors, and wherein each of the one or more acquisition devices is further configured to acquire three-dimensional images of the scene and transmit the corresponding three-dimensional images to the master control unit, and wherein the master control unit generates a collective three-dimensional map therefrom, wherein instructions included in the corresponding feedback signal transmitted by the master control unit to each of the one or more acquisition devices are based on an analysis of a quality of the collective three-dimensional map.

8. A method for an image acquisition system including one or more image acquisition devices, the method comprising:
emitting, via a plurality of laser projectors, a laser dot pattern including a dot density onto a scene including one or more objects therein;
capturing, via a first and a second image capture device, one or more images from the scene having the laser dot pattern projected thereupon;
transmitting, via the first and a second image capture device, the one or more images to a processing unit;
determining, via circuitry components, depth information from the one or more images for each object of the one or more objects in the scene, the depth information including a distance to the object relative to a position of the first and second image capture devices;
determining, via the circuitry components, an adjustment amount for the plurality of laser projectors based on the distance to the object relative to the position of the plurality of laser projectors; and
adjusting, via the circuitry components, an optical power level of the plurality of laser projectors by the adjustment amount by modulating both an optical power supplied to each of the plurality of laser projectors and a dot density of the laser dot pattern.

9. The method of claim 8, wherein modulating the dot density of the laser dot pattern includes decreasing the number of active laser projectors from the plurality of laser projectors to reduce the dot density of the laser dot pattern, and increasing the number of active laser projectors from the plurality of laser projectors to increase the dot density of the laser dot pattern.

10. The method of claim 8, further comprising:
determining, via a sensor, a distance to each of the one or more objects in the scene relative to the position of the plurality of laser projectors or the first and a second image capture device; and
communicating, via the sensor, the distance to the circuitry components,
wherein the step of determining the adjustment amount by the circuitry components is based further on the distance acquired by the sensor.

11. The method of claim 10, further comprising:
comparing, via the circuitry components, the distance to the object with a predetermined threshold distance that is less than a working distance of the first and a second image capture device; and disabling, via the circuitry components, one or more of the plurality of laser projectors when the distance to the object is below the predetermined threshold distance.

12. The method of claim 8, further comprising continuously adjusting, via the circuitry components, the optical power of the plurality of laser projectors in proportion to the distance of the objects.

13. The method of claim 8, wherein determining the adjustment amount is based on the shortest distance determined from the depth information when multiple objects are present in the scene.

14. A method for an image acquisition system including one or more image acquisition devices, the method comprising:
emitting, via one or more laser projectors, a laser dot pattern onto a scene including one or more objects therein;
capturing, via a first and a second image capture device, one or more images from the scene having the laser dot pattern projected thereupon;
transmitting, via the first and a second image capture device, the one or more images to a processing unit;
determining, via circuitry components, depth information from the one or more images for each object of the one or more objects in the scene, the depth information including a distance to the object relative to a position of the first and second image capture devices;
determining, via the circuitry components, an adjustment amount for the one or more laser projectors based on the distance to the object relative to the position of the one or more laser projectors; and
adjusting, via the circuitry components, an optical power level of the one or more laser projectors by the adjustment amount;
acquiring, via each of the one or more acquisition devices, one or more three-dimensional images of the scene;
transmitting, via the one or more acquisition devices, the one or more three-dimensional images of the scene to a master control unit;
generating, via the master control unit, a collective three-dimensional map therefrom;
analyzing, via the master control unit, the collective three-dimensional map to determine a map quality;
determining, via the master control unit, instructions for a feedback signal for each corresponding one of the one or more acquisition devices based on the analyzed map quality; and
transmitting, via the master control unit, the feedback signal to each corresponding one of the one or more acquisition devices.

15. An image acquisition device comprising:
a plurality of laser projectors, each laser projector operable to emit a laser dot pattern including a dot density onto a scene, the scene including one or more objects therein;
a first and second image capture device, each device operable to capture one or more images from the scene having the laser dot pattern projected thereupon; and
circuitry components operable to determine from the one or more images depth information for each object of the one or more objects in the scene, the depth information including a distance to the object relative to a position of the first and second image capture devices,
wherein the circuitry components are further in communication with each of the plurality of laser projectors, and wherein the circuitry components modulate both an optical power supplied to each of the plurality of laser projectors and a dot density of the laser dot pattern to adjust an optical power level of the laser projectors based on the distance to the object relative to a position of the first and second image capture devices.

16. The image acquisition device of claim 15, wherein when the distance to the object is less than a predetermined threshold distance, the circuitry components reduce optical power relative to a base setting supplied to the plurality of laser projectors, and wherein when the distance to the object is greater than a predetermined threshold distance, the circuitry components increase optical power relative to the base setting supplied to the plurality of laser projectors.

17. The image acquisition device of claim 16, wherein the circuitry components are configured to modulate the dot density of the laser dot pattern by decreasing the number of active laser projectors from the plurality of laser projectors to reduce the dot density of the laser dot pattern, and increasing the number of active laser projectors from the plurality of laser projectors to increase the dot density of the laser dot pattern.

18. The image acquisition device of claim 15, wherein each laser projector of the plurality of laser projectors has a separate driving circuit.

19. The image acquisition device of claim 15, wherein the circuitry components are further operable to compare a number of dots present in a portion of the one or more images from the scene having the detected object with an expected dot density for the portion at the one or more images from the scene at the determined distance.

20. The image acquisition device of claim 15, wherein each laser projector of the plurality of laser projectors has different laser dot pattern rotations.

* * * * *